(12) United States Patent
Kessler et al.

(10) Patent No.: US 6,622,225 B1
(45) Date of Patent: Sep. 16, 2003

(54) SYSTEM FOR MINIMIZING MEMORY BANK CONFLICTS IN A COMPUTER SYSTEM

(75) Inventors: Richard E. Kessler, Shrewsbury, MA (US); Michael S. Bertone, Marlborough, MA (US); Michael C. Braganza, Boston, MA (US); Gregg A. Bouchard, Round Rock, TX (US); Maurice B. Steinman, Marlborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 259 days.

(21) Appl. No.: 09/652,325

(22) Filed: Aug. 31, 2000

(51) Int. Cl.$^7$ ............................................... G06F 12/00
(52) U.S. Cl. ............................ 711/158; 711/5; 711/105
(58) Field of Search ............................ 711/5, 105, 148, 711/150–152, 154, 156–158, 167–169

(56) References Cited

U.S. PATENT DOCUMENTS

| | | | |
|---|---|---|---|
| 5,261,066 A | 11/1993 | Jouppi et al. | 395/425 |
| 5,317,718 A | 5/1994 | Jouppi | 395/425 |
| 5,758,183 A | 5/1998 | Scales | 395/825 |
| 5,761,729 A | 6/1998 | Scales | 711/148 |
| 5,787,480 A | 7/1998 | Scales et al. | 711/148 |
| 5,802,585 A | 9/1998 | Scales et al. | 711/154 |
| 5,809,450 A | 9/1998 | Chrysos et al. | 702/186 |
| 5,875,151 A | 2/1999 | Mick | 365/233 |
| 5,890,201 A | 3/1999 | McLellan et al. | 711/108 |
| 5,893,931 A | 4/1999 | Peng et al. | 711/206 |
| 5,918,250 A | 6/1999 | Hammond | 711/205 |
| 5,918,251 A | 6/1999 | Yamada et al. | 711/207 |
| 5,923,872 A | 7/1999 | Chrysos et al. | 395/591 |
| 5,950,228 A | 9/1999 | Scales et al. | 711/148 |
| 5,964,867 A | 10/1999 | Anderson et al. | 712/219 |
| 5,983,325 A | 11/1999 | Lewchuk | 711/137 |
| 6,000,044 A | 12/1999 | Chrysos et al. | 714/47 |
| 6,070,227 A | 5/2000 | Rokicki | 711/117 |
| 6,085,300 A | 7/2000 | Sunaga et al. | 711/168 |
| 6,295,586 B1 * | 9/2001 | Novak et al. | 365/203 |
| 6,374,331 B1 * | 4/2002 | Janakiraman et al. | 711/141 |
| 6,389,520 B2 * | 5/2002 | Christenson | 365/230.03 |
| 6,393,534 B1 * | 5/2002 | Chen et al. | 711/158 |

OTHER PUBLICATIONS

*Alpha Architecture Reference Manual*, Third Edition, The Alpha Architecture Committee, 1998 Digital Equipment Corporation (21 p.), in particular pp. 3–1 through 3–15.

*A Logic Design Structure For LSI Testability*, E. B. Eichelberger et al., 1977 IEEE (pp. 462–468).

(List continued on next page.)

Primary Examiner—Matthew Kim
Assistant Examiner—Woo H. Choi

(57) ABSTRACT

A computer system includes a memory controller interfacing the processor to a memory system. The memory controller supports a memory system with a plurality of memory devices, with multiple memory banks in each memory device. The memory controller supports simultaneous memory accesses to different memory banks. Memory bank conflicts are avoided by examining each transaction before it is loaded in the memory transaction queue. On a first clock cycle, the new pending memory request is transferred from a pending request queue to a memory mapper. On the subsequent clock cycle, the memory mapper formats the pending memory request into separate signals identifying the DEVICE, BANK, ROW and COLUMN to be accessed by the pending transaction. In the next clock cycle, the DEVICE and BANK signals are compared with every entry in the memory transaction queue to determine if a bank conflict exists. If so, the new memory request is rejected and recycled to the pending request queue.

28 Claims, 9 Drawing Sheets

OTHER PUBLICATIONS

*Direct RDRAM ™256/288–Mbit (512K×16/18×32s)*, Preliminary Information Document DL0060 Version 1.01 (69 p.).

*Testability Features of AMD–k6™Microprocessor*, R. S. Fetherston et al., Advanced Micro Devices (8 p.).

*Hardware Fault Containment in Scalable Shared–Memory Multiprocessors*, D. Teodosiu et al., Computer Systems Laboratory, Stanford University (12 p.), 1977.

*Cellular Disco: resource management using virtual clusters on shared–memory multiprocessors*, K. Govil et al., 1999 ACM 1–58113–140–2/99/0012 (16 p.).

*Are Your PLDs Metastable?*, Cypress Semiconductor Corporation, Mar. 6, 1997 (19 p.).

*Rambus®RIMM™Module (with 128/144Mb RDRAMs)*, Preliminary Information, Document DL0084 Version 1.1 (12 p.).

*Direct Rambus®RIMM®Module Specification Version 1.0*, Rambus Inc., SL–0006–100 (32 p.), 2000.

*End–To–End Fault Containment In Scalable Shared–Memory Multiprocessors*, D. Teodosiu, Jul. 2000 (148 p.).

A. Jain et al., *A 1.2 GHz Alpha Microprocessor with 44.8 GB/sec of chip pin bandwidth*, IEEE International Solid–State Circuits Conference 2001 Digest of Technical Papers, Feb. 2001, pp. 1–6.

* cited by examiner

SYSTEM FOR MINIMIZING MEMORY BANK CONFLICTS IN A COMPUTER SYSTEM

CROSS-REFERENCE TO RELATED APPLICATIONS

This application relates to the following commonly assigned co-pending applications entitled: "Apparatus And Method For Interfacing A High Speed Scan-Path With Slow-Speed Test Equipment," Ser. No. 09/653,642, filed Aug. 31, 2000, "Priority Rules For Reducing Network Message Routing Latency," Ser. No. 09/652,322, filed Aug. 31, 2000, "Scalable Directory Based Cache Coherence Protocol," Ser. No. 09/652,703, filed Aug. 31, 2000, "Scalable Efficient I/O Port Protocol," Ser. No. 09/652,391, filed Aug. 31, 2000, "Efficient Translation Lookaside Buffer Miss Processing In Computer Systems With A Large Range Of Page Sizes," Ser. No. 09/652,552, filed Aug. 31, 2000, "Fault Containment And Error Recovery Techniques In A Scalable Multiprocessor," Ser. No. 09/651,949, filed Aug. 31, 2000, "Speculative Directory Writes In A Directory Based Cache Coherent Nonuniform Memory Access Protocol," Ser. No. 09/652,834, filed Aug. 31, 2000, "Special Encoding Of Known Bad Data," Ser. No. 09/652,314, filed Aug. 31, 2000, "Broadcast Invalidate Scheme," Ser. No. 09/652,165, filed Aug. 31, 2000, "Mechanism To Track All Open Pages In A DRAM Memory System," Ser. No. 09/652,704, filed Aug. 31, 2000, "Programmable DRAM Address Mapping Mechanism," Ser. No. 09/653,093, filed Aug. 31, 2000, "Computer Architecture And System For Efficient Management Of Bi-Directional Bus," Ser. No. 09/652,323, filed Aug. 31, 2000, "An Efficient Address Interleaving With Simultaneous Multiple Locality Options," Ser. No. 09/652,452, filed Aug. 31, 2000, "A High Performance Way Allocation Strategy For A Multi-Way Associative Cache System," Ser. No. 09/653,092, filed Aug. 31, 2000, "Method And System For Absorbing Defects In High Performance Microprocessor With A Large N-Way Set Associative Cache," Ser. No. 09/651,948, filed Aug. 31, 2000, "A Method For Reducing Directory Writes And Latency In A High Performance, Directory-Based, Coherency Protocol," Ser. No. 09/652,324, filed Aug. 31, 2000, "Mechanism To Reorder Memory Read And Write Transactions For Reduced Latency And Increased Bandwidth," Ser. No. 09/653,094, filed Aug. 31, 2000, "Computer Resource Management And Allocation System," Ser. No. 09/651,945, filed Aug. 31, 2000, "Input Data Recovery Scheme," Ser. No. 09/653,643, filed Aug. 31, 2000, "Fast Lane Prefetching," Ser. No. 09/652,451, filed Aug. 31, 2000, "Mechanism For Synchronizing Multiple Skewed Source-Synchronous Data Channels With Automatic Initialization Feature," Ser. No. 09/652,480, filed Aug. 31, 2000, "Mechanism To Control The Allocation Of An N-Source Shared Buffer," Ser. No. 09/651,924, filed Aug. 31, 2000, and "Chaining Directory Reads And Writes To Reduce DRAM Bandwidth In A Directory Based CC-NUMA Protocol," Ser. No. 09/652,315, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to a computer system that includes one or more dynamic random access memory ("DRAM") devices for storing data. More particularly, the invention relates to a computer system with DRAM devices in which multiple banks of storage can be accessed simultaneously to enhance the performance of the memory devices. Still more particularly, the present invention relates to a system that effectively minimizes simultaneous accesses to the same bank of memory to avoid access delays.

2. Background of the Invention

Almost all computer systems include a processor and a system memory. The system memory functions as the working memory of the computer system, where data is stored that has been or will be used by the processor and other system components. The system memory typically includes banks of dynamic random access memory ("DRAM") circuits. According to normal convention, a memory controller interfaces the processor to a memory bus that connects electrically to the DRAM circuits. While DRAM circuits have become increasingly faster, the speed of memory systems typically lags behind the speed of the processor. Because of the large quantity of data that is stored in the system memory, it may at times be a bottleneck that slows down the performance of the computer system. Because of this disparity in speed, in most computer systems the processor must wait for data to be stored ("written") and retrieved ("read") from DRAM memory. The more wait states that a processor encounters, the slower the performance of the computer system.

Data generally is transferred between DRAM and other system components (such as the processor) in two steps. First the accessing component causes signals to be generated on the memory address bus representing the row address of the desired memory location, which is latched into the DRAM when the row address strobe ("RAS") signal is asserted low. At the next, or on subsequent clock cycles, the memory device latches in the column address signal when the column address strobe ("CAS") is asserted low. During a write transaction, data typically is written into memory on the falling edge of the CAS signal, when the write enable ("WE") signal is active. In a read cycle, data from the selected memory cell is driven onto the data out lines shortly after the assertion of the CAS signal while the write enable ("WE") is inactive.

The speed of memory circuits typically is based on two timing parameters. The first parameter is memory access time, which is the minimum time required by the memory circuit to set up a memory address and produce or capture data on or from the data bus. The second parameter is the memory cycle time, which is the minimum time required between two consecutive accesses to the memory circuit. The extra time required for consecutive memory accesses in a DRAM circuit is necessary because the internal memory circuits require additional time to recharge (or "precharge") to accurately produce data signals.

Because DRAM circuits typically operate slower than the processor and other system components, most computer systems provide certain high-speed access modes for DRAM circuits. An example of a prior art high-speed access mode is the page mode. The page mode enables faster memory operations by allowing successive memory accesses to the same page of memory to occur, because the row address need not be re-loaded, and thus all that is required for the subsequent memory access is to strobe the next column addresses to the DRAM. Thus, the time required to set up (or precharge) and strobe the row address for the same memory page is eliminated.

In addition, the assignee of the present invention has developed a memory access technique which permits certain memory operations to be pipelined, thus allowing certain memory operations to be performed in parallel. Thus, for example, and as set forth in more detail in certain of the co-pending applications filed concurrently with the this application and mentioned in the related applications section, multiple memory accesses may be ongoing at the same time. For example, one bank of memory may be precharged, while another memory bank is latching a row address, and a third memory bank is latching a column address. In this system, therefore, multiple memory operations may be performed in parallel to different memory banks in the system memory. A its problem, however, arises, if two memory accesses are made to the same memory bank, but not the same page. When a processor or other component attempts to access a memory bank that is already the subject of a memory access, a bank conflict occurs. A bank conflict degrades performance in a pipelined memory system, because a transaction to a memory bank that is already being accessed cannot be completed until the first transaction is completed. Thus, if a bank conflict arises, the memory access must be processed serially, and the advantages of the parallel memory system are lost while the bank conflict is resolved. Consequently, the typical approach is to compare new memory requests with the DRAM memory bank state to identify bank conflicts and to stall the new conflicting request until the first memory transaction is fully completed.

Memory systems with a large number of memory banks present an opportunity for increased parallelism. With increased parallelism of the memory system comes the need to track the use of more memory banks simultaneously. In particular, it is advantageous to track the new memory requests to determine if any request targets a memory bank that already is the target of a current memory transaction, or a transaction that has been scheduled for execution. In the event a new memory request results in a bank conflict with a scheduled or executing memory transaction, the memory controller can theoretically re-order the newly requested transactions to achieve a greater efficiency. Implementing such a system can, however, be extremely complex. Parallel memory systems may have numerous memory transactions queued, waiting to be executed. In addition, new memory requests may also be entered in a pending request queue while they wait to be placed in the memory transaction queue. Thus, to identify potential bank conflicts, it is necessary to compare all of the entries in the pending request queue with the DRAM memory bank state. An optimal implementation of this comparison (of multiple queue entries with multiple queue entries) can require a substantial amount of circuitry.

It would be advantageous if a simple technique could be used to compare pending memory requests with DRAM memory transactions in order to identify bank conflicts. It would also be advantageous if any such conflicting transactions could be re-ordered to avoid the bank conflicts, while continuing to process other non-conflicting transactions without delaying operation of the DRAM. Despite the apparent performance advantages of such a system, to date no such system has been implemented.

SUMMARY OF THE INVENTION

The problems noted above are solved in large part by the system and techniques of the present invention, which avoids delays resulting from bank conflicts using a system that compares a pending memory request on each clock cycle with all entries in a DRAM transaction queue. When a bank conflict is detected, the memory controller rejects the new conflicting transaction and does not transfer it to the DRAM transaction queue. On each subsequent clock cycle, the next pending memory request is similarly examined. Comparisons that do not produce a bank conflict are loaded in the DRAM transaction execution for execution, while those that produce a bank conflict are recycled in the pending request queue.

According to the preferred embodiment, a pending request queue stores requests that have been sent by the processor or other system component, but which have not yet been formatted for the memory and stored in the DRAM transaction queue prior to execution. Each clock cycle, an entry from the pending request queue is presented to a memory mapper, which re-formats the memory request with values representing the memory device ("DEVICE"), the memory bank this within that device ("BANK"), the row of the bank ("ROW"), and the column ("COLUMN") targeted by the memory request. On the next clock cycle, the DEVICE, BANK, ROW and COLUMN values are presented to the DRAM transaction queue. The DEVICE and BANK values are compared with each entry in the DRAM transaction queue to determine if a bank conflict exists between the pending memory request and any memory transaction stored in the DRAM transaction queue. According to the preferred embodiment, the ROW of each entry also is compared, to determine if the pending transaction targets the same page of memory as a previously queued transaction. If a match occurs between the DEVICE and BANK values (but not the ROW value), a dynamic wire is pulled low, causing a Reject signal to be asserted. The Reject signal is applied to the pending request queue, which causes the pending memory request to be re-loaded at the top of the pending request queue. If no bank conflict is found, the pending transaction is loaded in the DRAM transaction queue, and scheduled for execution.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. To the extent that any term is not specially defined in this specification, the intent is that the term is to be given it's plain and ordinary meaning.

DETAILED DESCRIPTION OF THE PREFERRED EMBODIMENTS

Figure 1:
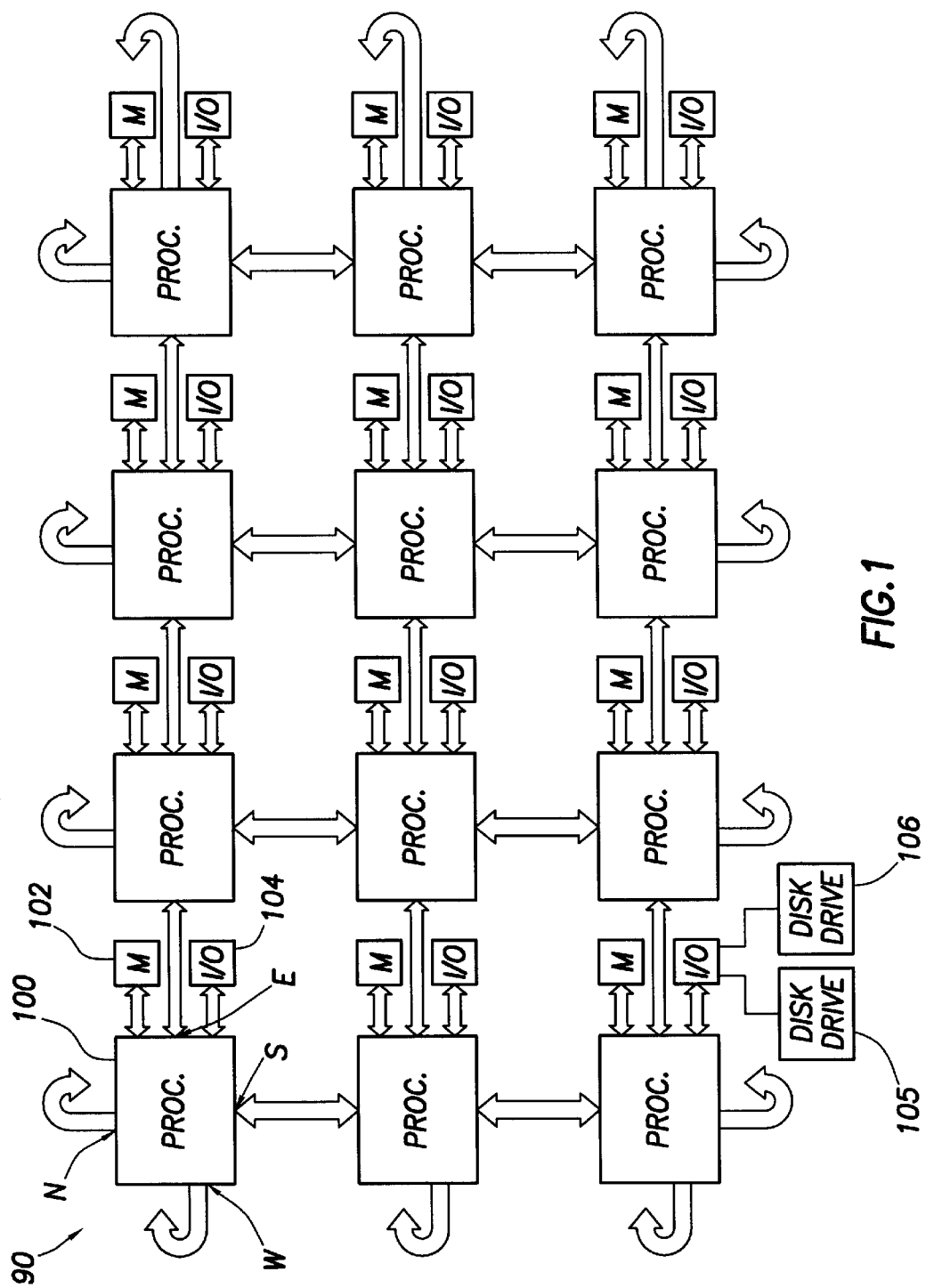
FIG. 1 shows a system level diagram of a multiple processor system coupled together in accordance with the preferred embodiment of the present invention.

Referring now to FIG. 1, in accordance with the preferred embodiment of the invention, a computer system 90 constructed in accordance with the preferred embodiment comprises one or more processors 100 coupled to a memory sub-system 102 and an input/output ("I/O") controller 104. As shown in FIG. 1, computer system 90 preferably includes multiple processors 100 (twelve such processors are shown for purposes of illustration), with each processor coupled to an associated memory sub-system 102 and an I/O controller 104. Although the computer system 90 is shown as a multiple processor system in FIG. 1, it should be understood that the present invention also may be implemented on a single processor system, and thus the following disclosure is intended to be illustrative of the preferred embodiment of practicing the invention, and is not intended to imply that the invention is limited to use in a multi-processor system.

According to the preferred embodiment, each processor 100 preferably includes four ports for connection to adjacent processors. The inter-processor ports are designated "north," "south," "east," and "west" in accordance with the well-known Manhattan grid architecture. As such, each processor 100 can be connected to four other processors. The processors on both end of the system layout preferably wrap around and connect to processors on the opposite side to implement a 2D torus-type connection. Although twelve processors 100 are shown in the exemplary embodiment of FIG. 1, any desired number of processors can be included. In the preferred embodiment, computer system 90 is designed to accommodate either 256 processors or 128 processors, depending on the size of the memory associated with the processors.

The I/O controller 104 provides an interface to various input/output devices, such as disk drives 105 and 106, as shown in the lower left-hand side of FIG. 1. Data from the I/O devices thus enters the 2D torus via the I/O controllers associated with the various processors. In addition to disk drives, other input/output devices also may be connected to the I/O controllers, including for example, keyboards, mice, CD-ROMs, DVD-ROMs, PCMCIA drives, and the like.

In accordance with the preferred embodiment, the memory 102 preferably comprises RAMbus™ memory devices, but other types of memory devices can be used if desired. The capacity of the memory devices 102 may be of any suitable size. The memory devices 102 preferably are implemented as RAMbus™ Interface Memory Modules ("RIMMs"). Details regarding the timing and operation of RAMbus™ RIMMs are generally available to the public from Rambus Inc.

Generally, the computer system 90 can be configured so that any processor 100 can access its own memory 102 and I/O devices as well as the memory and I/O devices of all other processors in the system. Preferably, the computer system may have physical connections between each processor resulting in low interprocessor communication times and improved memory and I/O device access reliability. If physical connections are not present between each pair of processors, a pass-through or bypass path preferably is available for each processor to access the memory and I/O devices of any other processor through one or more intermediary processors, as graphically depicted in FIG. 1.

The processors may be implemented with any suitable microprocessor architecture, although the Alpha processor is used in the preferred embodiment. Therefore, to aid in understanding the preferred embodiment of the present invention, details regarding the preferred processor architecture will be described with reference to FIGS. 2a and 2b, with the understanding that this architecture is not a mandatory requirement to practice the present invention.

Figure 2A:
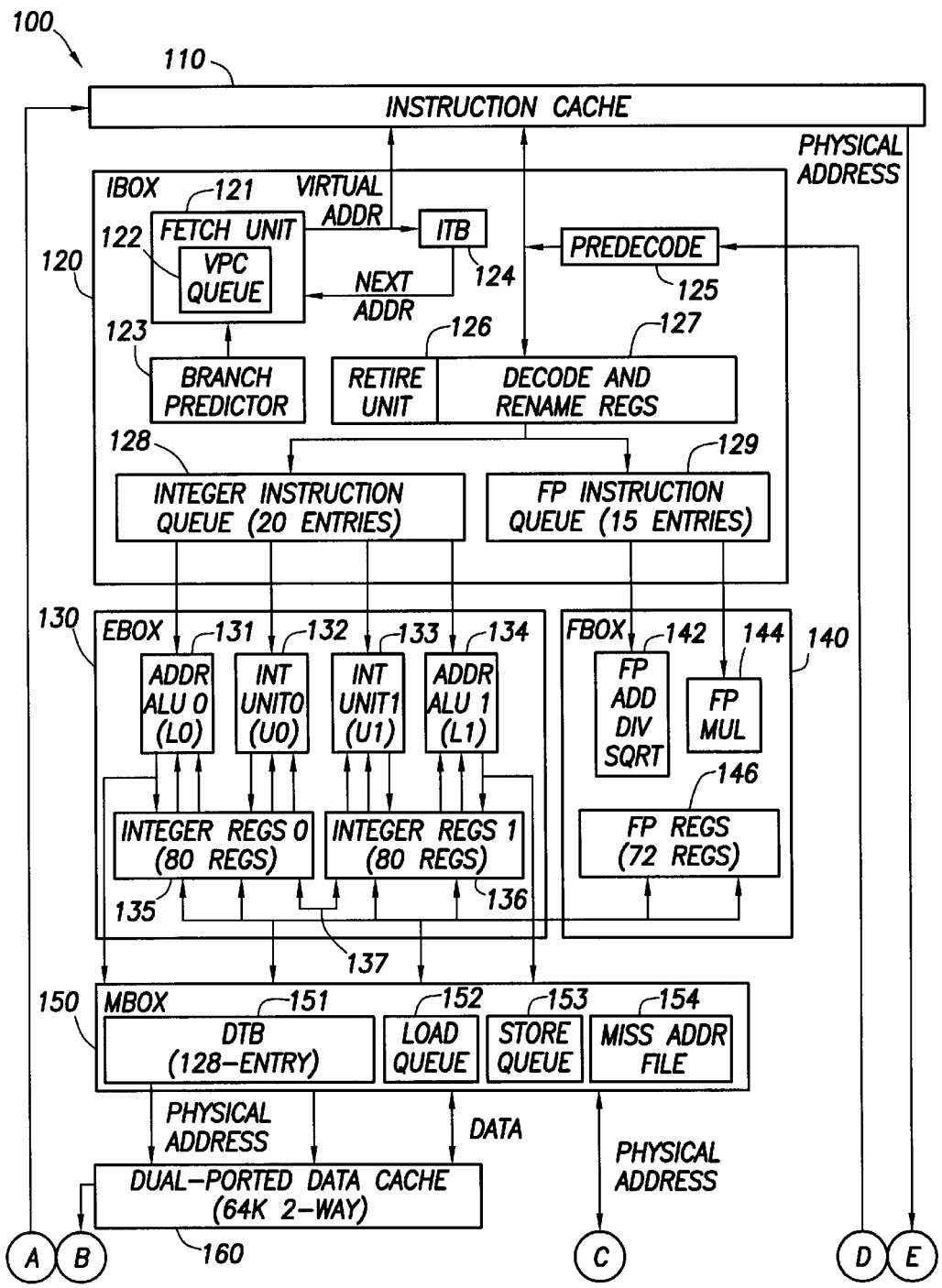
FIGS. 2a and 2b show a block diagram of one of the processors depicted in the preferred embodiment of FIG. 1.
Figure 2B:
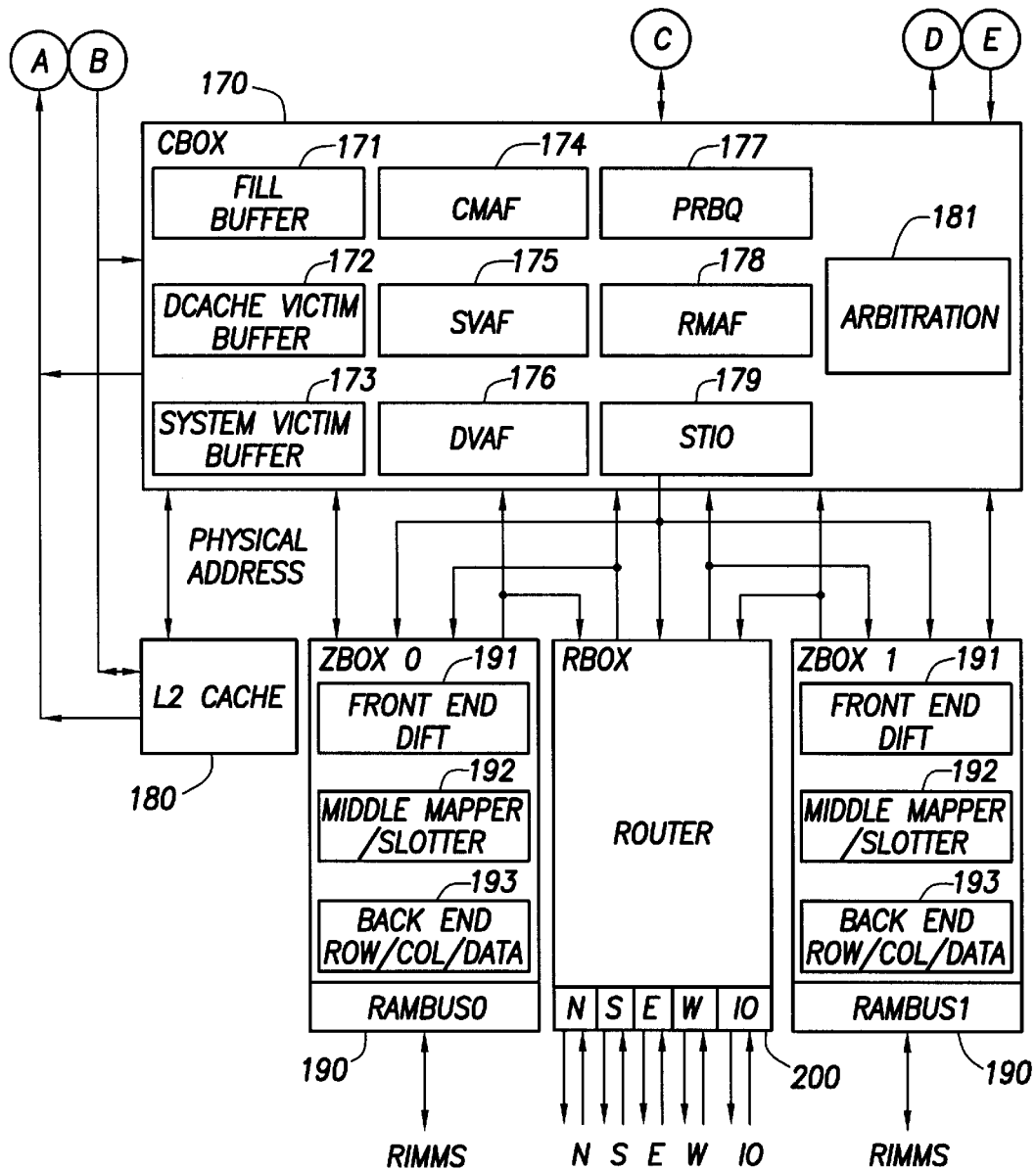

Referring now to FIGS. 2a and 2b, each processor 100 preferably includes an instruction cache 110, an instruction fetch, issue and retire unit ("Ibox") 120, an integer execution unit ("Ebox") 130, a floating-point execution unit ("Fbox") 140, a memory reference unit ("Mbox") 150, a data cache 160, an L2 instruction and data cache control unit ("Cbox") 170, a level L2 cache 180, two memory controllers ("Zbox0"and "Zbox1") 190, and an interprocessor and I/O router unit ("Rbox") 200. The following discussion describes each of these units in more detail.

Each of the various functional units 110–200 contains control logic that communicates with the control logic of other functional units, as shown in FIGS. 2a and 2b. Thus, referring still to FIGS. 2a and 2b, the instruction cache control logic 110 communicates with the Ibox 120, Cbox 170, and L2 Cache 180. In addition to the control logic communicating with the instruction cache 110, the Ibox control logic 120 communicates with Ebox 130, Fbox 140 and Cbox 170. The Ebox 130 and Fbox 140 control logic both communicate with the Mbox 150, which in turn communicates with the data cache 160 and Cbox 170. The Cbox control logic also communicates with the L2 cache 180, Zboxes 190, and Rbox 200.

Referring still to FIGS. 2a and 2b, the Ibox 120 preferably includes a fetch unit 121 which contains a virtual program counter ("VPC") 122, a branch predictor 123, an instruction-stream translation buffer 124, an instruction predecoder 125, a retire unit 126, decode and rename registers 127, an integer instruction queue 128, and a floating point instruction queue 129. Generally, the VPC 122 maintains virtual addresses for instructions that are in-flight. An instruction is said to be "in-flight" from the time it is fetched until it retires or aborts. The Ibox 120 can accommodate as many as 80 instructions, in 20 successive fetch slots, in-flight between the decode and rename registers 127 and the end of the pipeline. The VPC 122 preferably includes a 20-entry queue to store the fetched VPC addresses.

The branch predictor 123 is used by the Ibox 120 for predicting the outcome of branch instructions. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the fetch unit in the processor fetches the branch instruction. In order to keep the pipeline full, which is desirable for efficient operation, the processor preferably includes branch prediction logic that predicts the outcome of a branch instruction before it is actually executed (also referred to as "speculating"). The branch predictor 123, which receives addresses from the VPC queue 122, preferably bases its speculation on short and long-term history of prior instruction branches. As such, using branch prediction logic, the fetch unit can speculate the outcome of a branch instruction before it is actually executed. The speculation, however, may or may not turn out to be accurate. Branch predictor 123 uses any suitable branch prediction algorithm that results in correct speculations more often than misspeculations, enhancing the overall performance of the processor.

The instruction translation buffer ("ITB") 124 couples to the instruction cache 110 and the fetch unit 121. The ITB 124 comprises a 128-entry, fully-associative instruction-stream translation buffer that is used to store recently used instruction-stream address translations and page protection information. Preferably, each of the entries in the ITB 124 may be 1, 8, 64 or 512 contiguous 8-kilobyte ("KB") pages or 1, 32, 512, 8192 contiguous 64-kilobyte pages. The allocation scheme used for the ITB 124 is a round-robin scheme, although other schemes can be used as desired.

The predecode logic 125 reads an octaword (16 contiguous bytes) from the instruction cache 110. Each octaword read from the instruction cache 110 may contain up to four naturally aligned instructions per cycle. Branch prediction and line prediction bits accompany the four instructions fetched by the predecoder 125. The branch prediction scheme implemented in branch predictor 123 generally works most efficiently when only one branch instruction is contained among the four fetched instructions. The predecoder 125 predicts the instruction cache line that the branch predictor 123 will generate. The predecoder 125 generates fetch requests for additional instruction cache lines and stores the instruction stream data in the instruction cache.

Referring still to FIGS. 2a and 2b, the retire unit 126 fetches instructions in program order, executes them out of order, and then retires (also called "committing" an instruction) them in order. The Ibox 120 logic maintains the architectural state of the processor by retiring an instruction only if all previous instructions have executed without generating exceptions or branch mispredictions. An exception is any event that causes suspension of normal instruction execution. Retiring an instruction commits the processor to any changes that the instruction may have made to the software accessible registers and memory. The processor 100 preferably includes the following three machine code accessible hardware: integer and floating-point registers, memory, and internal processor registers. With respect to the present invention, one of the internal process registers for the Cbox 170 is the Cbox stripe control register (with machine code mnemonic $CBOX_{13}STP_{13}CTL$).

The decode and rename registers 127 contain logic that forwards instructions to the integer and floating-point instruction queues 128, 129. The decode and rename registers 127 preferably eliminate register write-after-read ("WAR") and write-after-write ("WAW") data dependency while preserving true read-after-write ("RAW") data dependencies. This permits instructions to be dynamically rescheduled. In addition, the decode and rename registers 127 permit the processor to speculatively execute instructions before the control flow preceding those instructions is resolved.

The logic in the decode and rename registers 127 preferably translates each instruction's operand register specifiers from the virtual register numbers in the instruction to the physical register numbers that hold the corresponding architecturally-correct values. The logic also renames each instruction destination register specifier from the virtual number in the instruction to a physical register number chosen from a list of free physical registers, and updates the register maps. The decode and rename register logic 127 can process four instructions per cycle. Preferably, the logic in the decode and rename registers 127 does not return the physical register, which holds the old value of an instruction's virtual destination register, to the free list until the instruction has been retired, indicating that the control flow up to that instruction has been resolved.

If a branch misprediction or exception occurs, the register logic backs up the contents of the integer and floating-point rename registers to the state associated with the instruction that triggered the condition, and the fetch unit 121 restarts at the appropriate Virtual Program Counter ("VPC"). Preferably, as noted above, 20 valid fetch slots containing up to 80 instructions can be in flight between the registers 127 and the end of the processor's pipeline, where control flow is finally resolved. The register 127 logic is capable of backing up the contents of the registers to the state associated with any of these 80 instructions in a single cycle. The register logic 127 preferably places instructions into the integer or floating-point issue queues 128, 129, from which they are later issued to functional units 130 or 136 for execution.

The integer instruction queue 128 preferably includes capacity for 20 integer instructions. The integer instruction queue 128 issues instructions at a maximum rate of four instructions per cycle. The specific types of instructions processed through queue 128 include: integer operate commands, integer conditional branches, unconditional branches (both displacement and memory formats), integer and floating-point load and store commands, Privileged Architecture Library ("PAL") reserved instructions, integer-to-floating-point and floating-point-integer conversion commands.

Referring still to FIGS. 2a and 2b, the integer execution unit ("Ebox") 130 includes arithmetic logic units ("ALUs") 131, 132, 133, and 134 and two integer register files 135. Ebox 130 preferably comprises a 4-path integer execution unit that is implemented as two functional-unit "clusters" labeled 0 and 1. Each cluster contains a copy of an 80-entry, physical-register file and two subclusters, named upper ("U") and lower ("L"). As such, the subclusters 131–134 are labeled U0, L0, U1, and L1. Bus 137 provides cross-cluster communication for moving integer result values between the clusters.

The subclusters 131–134 include various components that are not specifically shown in FIG. 2a. For example, the subclusters preferably include four 64-bit adders that are used to calculate results for integer add instructions, logic units, barrel shifters and associated byte logic, conditional branch logic, a pipelined multiplier for integer multiply operations, and other components known to those of ordinary skill in the art.

Each entry in the integer instruction queue 128 preferably asserts four request signals—one for each of the Ebox 130 subclusters 131, 132, 133, and 134. A queue entry asserts a request when it contains an instruction that can be executed by the subcluster, if the instruction's operand register values are available within the subcluster. The integer instruction queue 128 includes two arbiters—one for the upper subclusters 132 and 133 and another arbiter for the lower subclusters 131 and 134. Each arbiter selects two of the possible 20 requesters for service each cycle. Preferably, the integer instruction queue 128 arbiters choose between simultaneous requesters of a subcluster based on the age of the request—older requests are given priority over newer requests. If a given instruction requests both lower subclusters, and no older instruction requests a lower subcluster, then the arbiter preferably assigns subcluster 131 to the instruction. If a given instruction requests both upper subclusters, and no older instruction requests an upper subcluster, then the arbiter preferably assigns subcluster 133 to the instruction.

The floating-point instruction queue 129 preferably comprises a 15-entry queue and issues the following types of instructions: floating-point operates, floating-point conditional branches, floating-point stores, and floating-point register to integer register transfers. Each queue entry preferably includes three request lines—one for the add pipeline, one for the multiply pipeline, and one for the two store pipelines. The floating-point instruction queue 129 includes three arbiters—one for each of the add, multiply, and store pipelines. The add and multiply arbiters select one requester per cycle, while the store pipeline arbiter selects two requesters per cycle, one for each store pipeline. As with the integer instruction queue 128 arbiters, the floating-point instruction queue arbiters select between simultaneous requesters of a pipeline based on the age of the request—older request are given priority. Preferably, floating-point store instructions and floating-point register to integer register transfer instructions in even numbered queue entries arbitrate for one store port. Floating-point store instructions and floating-point register to integer register transfer instructions in odd numbered queue entries arbitrate for the second store port.

Floating-point store instructions and floating-point register to integer register transfer instructions are queued in both the integer and floating-point queues. These instructions wait in the floating-point queue until their operand register values are available from the floating-point execution unit ("Fbox") registers. The instructions subsequently request service from the store arbiter. Upon being issued from the floating-point queue 129, the instructions signal the corresponding entry in the integer queue 128 to request service. Finally, upon being issued from the integer queue 128, the operation is completed.

The integer registers 135, 136 preferably contain storage for the processor's integer registers, results written by instructions that have not yet been retired, and other information as desired. The two register files 135, 136 preferably contain identical values. Each register file preferably includes four read ports and six write ports. The four read ports are used to source operands to each of the two sub clusters within a cluster. The six write ports are used to write results generated within the cluster or another cluster and to write results from load instructions.

The floating-point execution queue ("Fbox") 129 contains a floating-point add, divide and square-root calculation unit 142, a floating-point multiply unit 144 and a register file 146. Floating-point add, divide and square root operations are handled by the floating-point add, divide and square root calculation unit 142 while floating-point operations are handled by the multiply unit 144.

The register file 146 preferably provides storage for 72 entries including 31 floating-point registers and 41 values written by instructions that have not yet been retired. The Fbox register file 146 contains six read ports and four write ports (not specifically shown). Four read ports are used to source operands to the add and multiply pipelines, and two read ports are used to source data for store instructions. Two write ports are used to write results generated by the add and multiply pipelines, and two write ports are used to write results from floating-point load instructions.

Referring still to FIG. 2*a,* the Mbox 150 controls the L1 data cache 160 and ensures architecturally correct behavior for load and store instructions. The Mbox 150 preferably contains a datastream translation buffer ("DTB") 151, a load queue ("LQ") 152, a store queue ("SQ") 153, and a miss address file ("MAF") 154. The DTB 151 preferably comprises a fully associative translation buffer that is used to store data stream address translations and page protection information. Each of the entries in the DTB 151 can map 1, 8, 64, or 512 contiguous 8-KB pages. The allocation scheme preferably is round robin, although other suitable schemes could also be used. The DTB 151 also supports an 8-bit Address Space Number ("ASN") and contains an Address Space Match ("ASM") bit. The ASN is an optionally implemented register used to reduce the need for invalidation of cached address translations for process-specific addresses when a context switch occurs.

The LQ 152 preferably comprises a reorder buffer used for load instructions. It contains 32 entries and maintains the state associated with load instructions that have been issued to the Mbox 150, but for which results have not been delivered to the processor and the instructions retired. The Mbox 150 assigns load instructions to LQ slots based on the order in which they were fetched from the instruction cache 110, and then places them into the LQ 152 after they are issued by the integer instruction queue 128. The LQ 152 also helps to ensure correct memory reference behavior for the processor.

The SQ 153 preferably is a reorder buffer and graduation unit for store instructions. It contains 32 entries and maintains the state associated with store instructions that have been issued to the Mbox 150, but for which data has not been written to the data cache 160. The Mbox 150 assigns store instructions to SQ slots based on the order in which they were fetched from the instruction cache 110 and places them into the SQ 153 after they are issued by the instruction cache 110. The SQ 153 holds data associated with the store instructions issued from the integer instruction unit 128 until they are retired, at which point the store can be allowed to update the data cache 160. The LQ 152 also helps to ensure correct memory reference behavior for the processor. The MAF 154 preferably comprises a 16-entry file that holds physical addresses associated with pending instruction cache 110 and data cache 160 fill requests and pending input/output ("I/O") space read transactions.

Processor 100 preferably includes two on-chip primary-level ("L1") instruction and data caches 110 and 160, and a single secondary-level, unified instruction/data ("L2") cache 180 (FIG. 2*b*). The L1 instruction cache 110 preferably comprises a 64-KB virtual-addressed, two-way set-associative cache. Prediction logic improves the performance of the two-way set-associative cache without slowing the cache access time. Each instruction cache block preferably contains a plurality (preferably 16) instructions, virtual tag bits, an address space number, an address space match bit, a one-bit PALcode bit to indicate physical addressing, a valid bit, data and tag parity bits, four access-check bits, and predecoded information to assist with instruction processing and fetch control.

The L1 data cache 160 preferably comprises a 64-KB, two-way set associative, virtually indexed, physically tagged, write-back, read/write allocate cache with 64-byte cache blocks. During each cycle the data cache 160 preferably performs one of the following transactions: two quadword (or shorter) read transactions to arbitrary addresses, two quadword write transactions to the same aligned octaword, two non-overlapping less-than quadword writes to the same aligned quadword, one sequential read and write transaction from and to the same aligned octaword. Preferably, each data cache block contains 64 data bytes and associated quadword ECC bits, physical tag bits, valid, dirty, shared, and modified bits, tag parity bit calculated across the tag, dirty, shared, and modified bits, and one bit to control round-robin set allocation. The data cache 160 is organized to contain two sets, each with 512 rows containing 64-byte blocks per row (i.e., 32-KB of data per set). The processor 100 uses two additional bits of virtual address beyond the bits that specify an 8-KB page in order to specify the data cache row index. A given virtual address might be found in four unique locations in the data cache 160, depending on the virtual-to-physical translation for those two bits. The processor 100 prevents this aliasing by keeping only one of the four possible translated addresses in the cache at any time. The L2 cache 180 preferably comprises a 1.75-MB, seven-way set associative write-back mixed instruction and data cache. Preferably, the L2 cache holds physical address data and coherence state bits for each block.

Referring now to FIG. 2b, the L2 instruction and data cache control unit ("Cbox") 170 controls the L2 instruction and data cache 190 and system ports. As shown, the Cbox 170 contains a fill buffer 171, a data cache victim buffer 172, a system victim buffer 173, a cache miss address file ("CMAF") 174, a system victim address file ("SVAF") 175, a data victim address file ("DVAF") 176, a probe queue ("PRBQ") 177, a requester miss-address file ("RMAF") 178, a store to I/O space ("STIO") 179, and an arbitration unit 181.

The fill buffer 171 preferably buffers data received from other functional units external to the Cbox. The data and instructions are written into the fill buffer 171, and other logic units in the Cbox process the data and instructions before relaying to other functional units or the L1 cache.

The data cache victim buffer ("VDF") 172 preferably stores data flushed from the L1 cache or sent to the System Victim Data Buffer 173. The System Victim Data Buffer ("SVDB") 173 is used to send data flushed from the L2 cache to other processors in the system and to memory. Cbox Miss-Address File ("CMAF") 174 preferably holds addresses of any transaction that results in an L1 cache miss. CMAF updates and maintains the status of these addresses. The System Victim-Address File ("SVAF") 175 in the Cbox preferably contains the addresses of all SVDB data entries. The Data Victim-Address File ("DVAF") 176 preferably contains the addresses of all data cache victim buffer ("VDF") data entries.

The Probe Queue ("PRBQ") 177 preferably comprises an 18-entry queue that holds pending system port cache probe commands and addresses. This queue includes 10 remote request entries, 8 forward entries, and lookup L2 tags and requests from the PRBQ content addressable memory ("CAM") against the RMAF, CMAF and SVAF. Requestor Miss-Address Files ("RMAF") 178 in the Cbox preferably accepts requests and responds with data or instructions from the L2 cache. Data accesses from other functional units in the processor, other processors in the computer system or any other devices that might need data out of the L2 cache are sent to the RMAF for service. The Store Input/Output ("STIO") 179 preferably transfer data from the local processor to I/O cards in the computer system. Finally, arbitration unit 181 in the Cbox preferably arbitrates between load and store accesses to the same memory location of the L2 cache and informs other logic blocks in the Cbox and other computer system functional units of any conflict.

Referring still to FIG. 2b, processor 100 preferably includes dual, integrated RAMbus™ memory controllers 190 (identified as Zbox0 and Zbox1). The dual memory controllers are used to interface with memory systems on two different memory ports (referred to herein as port 0 and port 1), so that one memory controller interfaces one memory port, and the other memory controller interfaces with the other memory port. Each controller 190 preferably controls 4 or 5 channels of information flow with the main memory 102 associated with that processor (FIG. 1). Each Zbox 190 preferably includes a front-end directory in-flight table ("DIFT") 191, a middle mapper 192, and a back end DRAM transaction queue 193.

Figure 3:
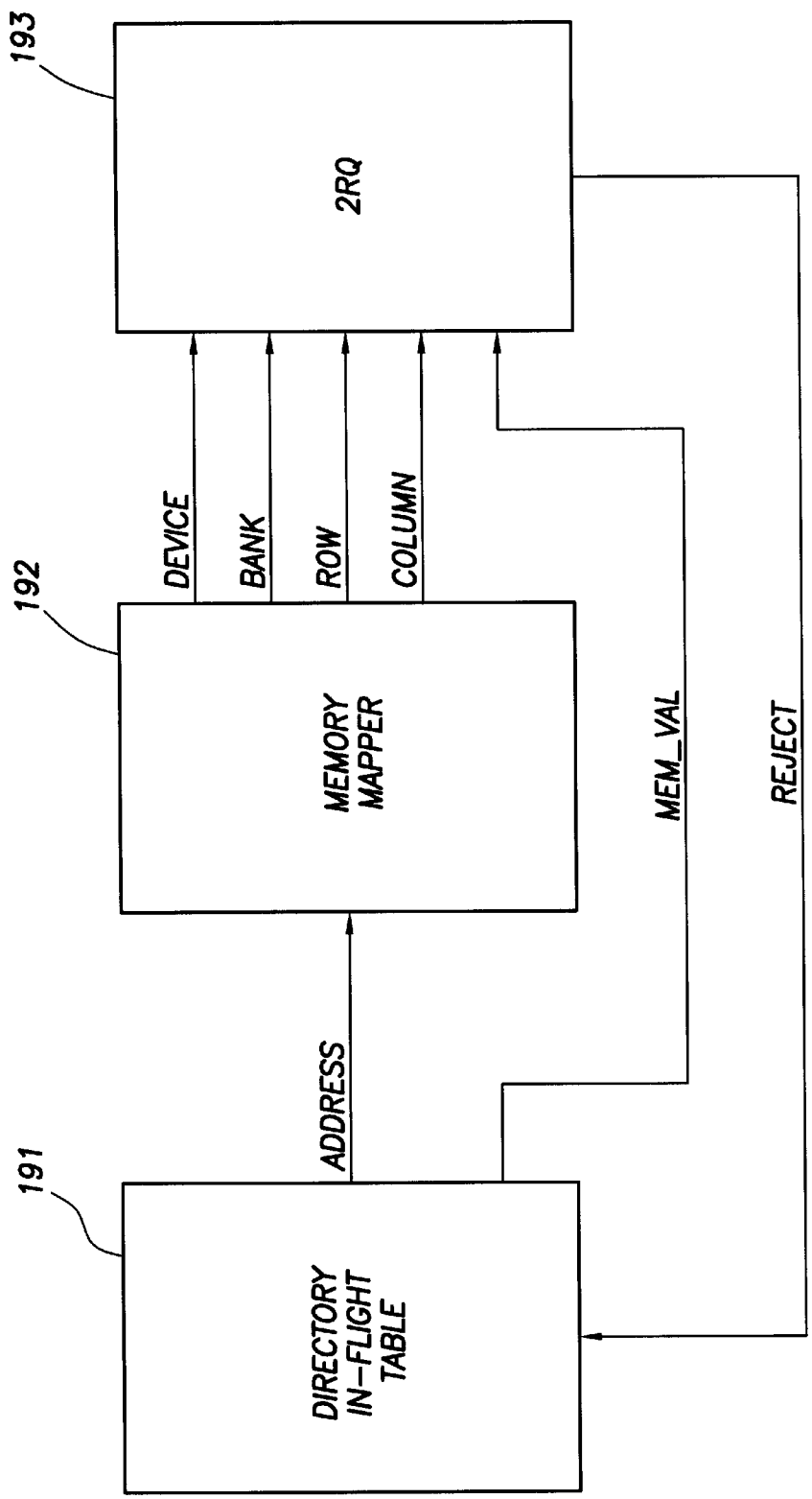
FIG. 3 is a block diagram of the memory controller shown in FIG. 2b, constructed in accordance with the preferred embodiment.

Referring now to FIGS. 2b and 3, the front-end DIFT 191 performs a number of functions including managing the processor's directory-based memory coherency protocol, processing request commands from the Cbox 170 and Rbox 200, sending forward commands to the Rbox 200, sending response commands to and receiving packets from the Cbox and Rbox, and tracking up to 32 in-flight transactions in a 32 entry pending request queue. The front-end DIFT 191 also sends directory read and write memory requests to the Zbox middle mapper 192 and conditionally updates directory information based on request type, Local Probe Response ("LPR") status and directory state. In the event that a pending memory request targets a memory bank that is the subject of a transaction queued in the DRAM transaction queue 193, the DIFT receives a reject signal from the DRAM transaction queue. According to the preferred embodiment, the reject signal is not asserted if the pending memory request targets a memory bank that is the subject of a transaction queued in the DRAM transaction queue that would result in a page hit.

The Zbox memory mapper 192 preferably maps the physical address of the memory request from the DIFT into RAMbus™ device format by issuing commands that identify the device, bank, row, and column where the memory request is targeted. The middle mapper 192 also maintains an open-page table to track all open pages and to close pages on demand if bank conflicts arise, as described below in relation to FIG. 6. The mapper 192 also schedules RAMbus™ transactions such as timer-based requests to the PRE, RAS and CAS queues. According to the preferred embodiment, the memory mapper 192 has the capability of issuing PRE, RAS and CAS instructions simultaneously to the precharge queue, RAS queue, and the CAS queues.

Referring still to FIG. 2b and 3, the DRAM transaction queue 193 preferably packetizes the address, control, and data into RAMbus™ format and provides the electrical interface to the RAMbus™ devices themselves. The DRAM transaction queue 193 preferably includes transaction queues that are capable of storing instructions prior to execution. Each of the different queues are capable of simultaneously issuing commands to different RAMbus™ memory banks. As shown in FIG. 5c, the DRAM transaction queue 193 preferably includes a precharge queue 555, a RAS queue 565, a CAS read queue 575, and a CAS write queue 585, each of which comprises a content addressable memory to enable content searching for matches with other pending transactions, as will be explained in more detail below. The precharge queue 555 and RAS queue 565 preferably are capable of storing four transactions, while the CAS read queue 575 and CAS write queue 585 preferably are capable of storing eight transactions.

Referring again to FIG. 2b, the Rbox 200 provides the interfaces to as many as four other processors and one I/O controller 104 (FIG. 1). The inter-processor interfaces are designated as North ("N"), South ("S"), East ("E"), and West ("W") and provide two-way communication between adjacent processors.

Figure 4A:
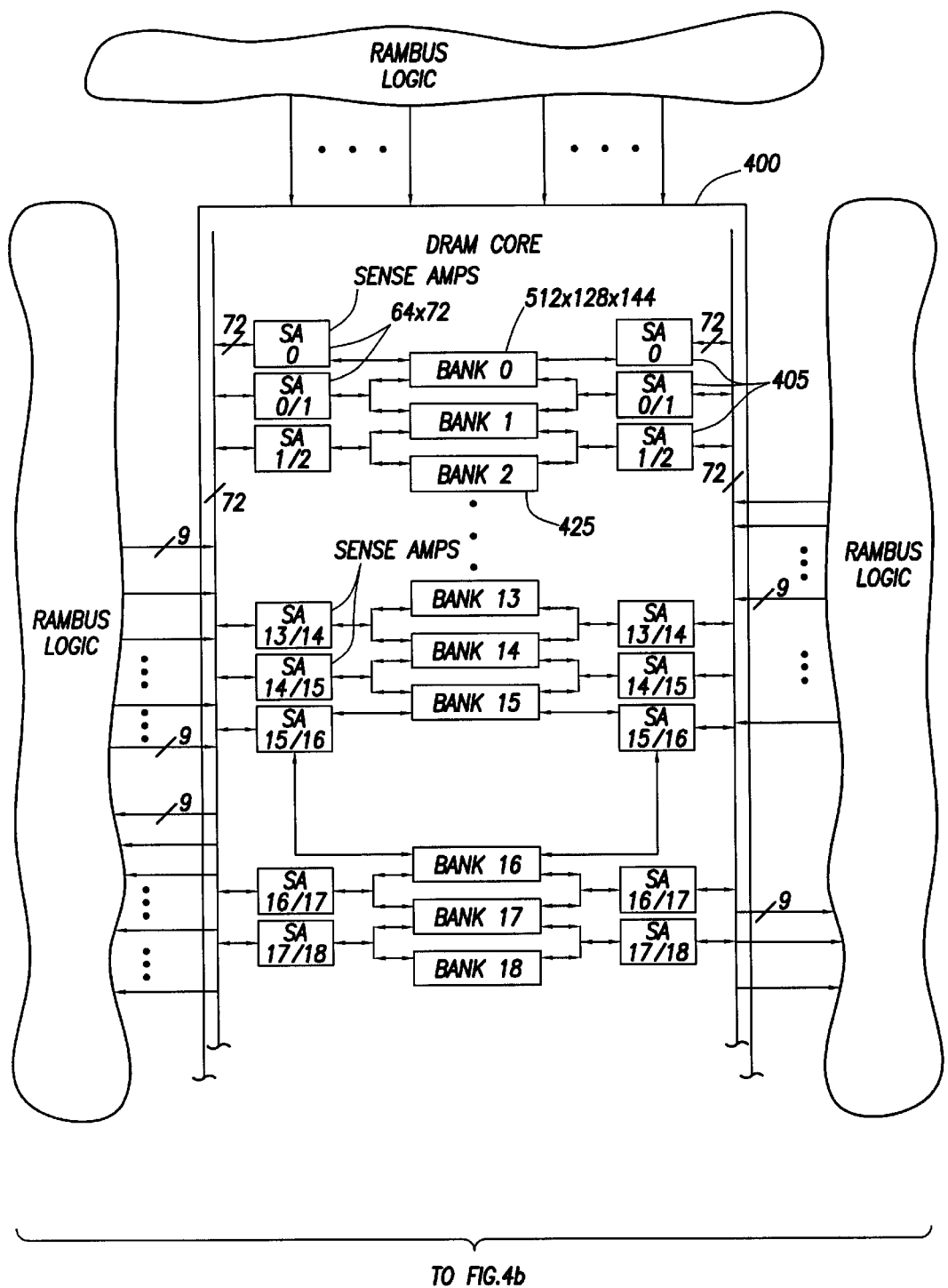
FIG. 4 is an exemplary embodiment of the RAMbus™ memory system of FIG. 2b.
Figure 4B:
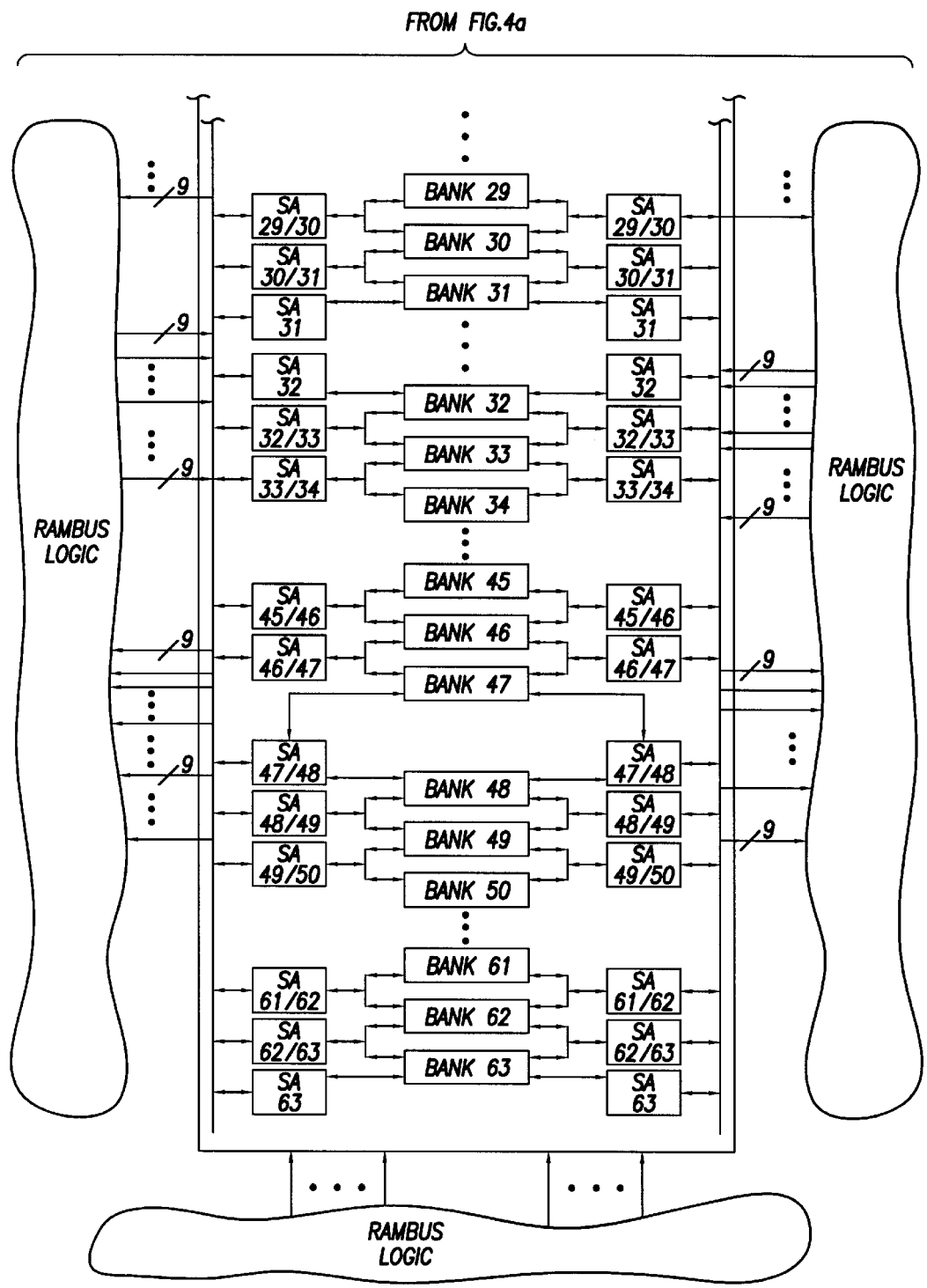

Referring now to FIG. 4, a RAMbus™ DRAM ("RDRAM") device includes a DRAM core 400 containing memory banks 425 and sense amplifiers 405 and RAMbus™ interface logic that permits an external control device to access the DRAM core at up to 1.6 gigabytes/second. A number of memory banks are provided in each DRAM device. As an illustration, sixty-four banks are shown in the DRAM device of FIG. 4, although it should be understood that DRAM devices may be used with a different number of banks. For a DRAM device with 64 banks, each DRAM core preferably contains 64 sense amplifiers, with each sense amplifier shared between two adjacent banks of the DRAM core (except for any sense amplifiers that are not shared due to the DRAM core architecture). Thus, for example, banks 13 and 14 share sense amps. Although most banks share sense amps, if desired by the system architect, each bank may have its own sense amp. The decision regarding sharing of sense amps, therefore, is a system architectural feature, that may be determined based upon a balancing of system performance, cost and size.

The sense amps operate as a memory cache for the associated memory bank. In operation, when a memory page is opened, it is loaded in the associated sense amps. When the page is closed, the page is re-loaded in the memory bank. Thus, if a memory page is accessed, it is clear that a subsequent access to the same memory page can be processed more quickly because the page is already open and available in the sense amp. If conversely, a memory access is made to a different page in the same memory bank, then the page must be closed by re-loading the contents of the sense amp in the memory bank, and then loading the page being accessed into the sense amp. Because the sense amp cannot be loaded and unloaded at the same time, memory accesses to the same bank, but different page, take a relatively long time to process because the first memory transaction must be completed before the subsequent memory access can begin. In fact, if the memory is configured with shared sense amps as in FIG. 4, a memory access to an adjacent memory bank may result in a bank conflict because the same delays result due to the sharing of the sense amps. Thus, the term "bank conflict" as used herein is intended to include bank conflicts that may result from memory accesses to different banks in memory systems with shared sense amps.

The sense amplifiers preferably are connected through data paths DQA and DQB that read and write data to RAMbus™ interface logic that is then output to the memory controller. Control lines Precharge, RowA, and ColCRd/ ColCWr, respectively, cause a memory bank to close a page, activate a page, or read/write a page to the memory bank through DQA and DQB.

In the preferred embodiment, the 64 Mbyte core of the RDRAM is divided into 64 one-Mbyte banks, each organized as 512 rows, with each row containing 128 columns and each column containing sixteen bytes. Thus, each row contains 2 Kilobytes of data (128*16=2 Kilobytes). A column is the smallest unit of data that can be addressed in a memory bank. As noted, the RDRAM preferably contains 64 sense amplifier buffers. Each sense amplifier buffer preferably is capable of storing 1024 bytes (512 for DQA and 512 for DQB) and, in the preferred embodiment, can hold one-half of one row of a RDRAM bank. The number of bytes that can be stored in two sense amplifiers is called the page size of the RDRAM device because each bank has access to two sense amplifiers. Thus the page size for the preferred embodiment is 2048 bytes (and is thus equivalent to a row size). In other embodiments of the invention, a page can be 1 Kilobyte or 4 Kilobytes based on the storage capacity of the sense amplifier. A sense amplifier may hold any of the 512 half-rows of an associated memory bank. However, as mentioned above, each sense amplifier is shared between two adjacent banks of the RDRAM. This introduces the restriction that adjacent banks in the preferred embodiment may not be simultaneously accessed.

The Control line Precharge coupled to the DRAM core transmits a precharge command that, along with the DEVICE and BANK address values, causes the selected memory bank to release its two associated sense amplifiers. This permits a different row in that memory bank to be activated or permits adjacent memory banks to be activated. The RowA control line coupled to the DRAM core transmits an Activate command that, along with the DEVICE, BANK and ROW address values, causes the selected row of the selected bank to be loaded into its associated sense amplifiers (two 512 byte sense amplifiers for DQA and two 512 byte sense amplifiers for DQB). The ColCRd command is issued with a DEVICE, BANK, and COLUMN address value to transfer a column of data (16 bytes) from one of the two sense amplifiers shared by the memory bank through the DQA/DQB data paths to the RAMbus™ interface logic. The data is then output to the Zbox 190 memory controller. A ColCWr command transfers a column of data from the Zbox memory controller 190 through the RAMbus™ interface logic and DQA/DQB data paths to one of the two sense amplifiers identified by the DEVICE, BANK and COLUMN address values.

According to the preferred embodiment, thirty-two RAMbus memory chips are supported. It should be understood, of course, that other size and types of memory components may be provided without departing from the invention. The number and types of memory chips supported is arbitrary, and no specific memory size is considered mandatory to practice the present invention.

Figure 6:
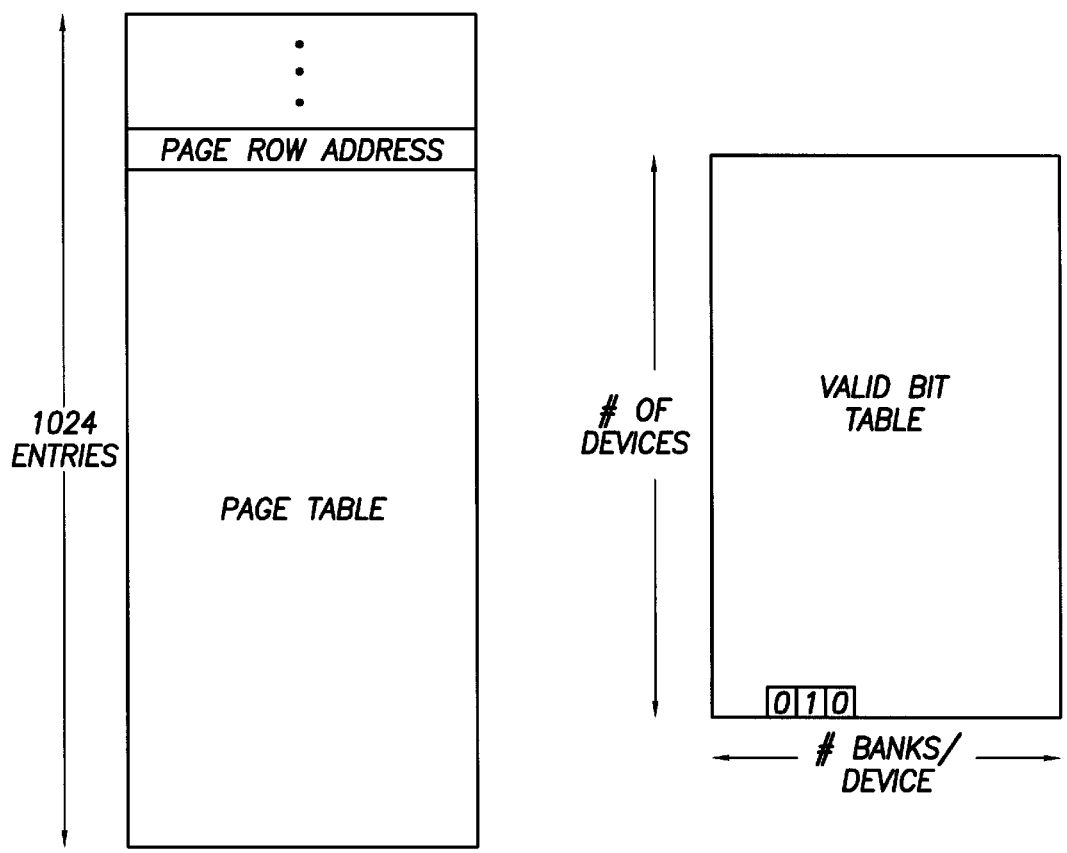
FIG. 6 depicts a Page Table and a Valid Bit Table for the memory mapper of FIG. 5b.

Referring now to FIG. 6, a Page Table and a Valid Bit Table preferably are maintained by the ZRQ 193, although these tables may be maintained or controlled by other system resources, if desired. Each memory bank of each memory chip in the system is assigned a row in the Page Table. During normal operation, the ZRQ 193 identifies the row in any memory bank that currently is active (i.e., that is being held in a sense amp) in a designated row in the Page Table. In a system capable of supporting 32 memory devices, each with up to 64 banks, 1024 entries are provided in the Page Table. This number of entries suffices for a system which has shared sense amps, because only half of the banks can be active at any time due to the sharing. If sense amps were not shared, then 2048 entries would be required to support a system with 32 memory devices, each of which has 64 banks. Thus, the Page Table functions to record currently executing transactions, by identifying the page that is targeted. This permits the state of the bank targeted by a pending memory request to be checked in the Page Table as part of the conflict-checking process.

The Valid ID Table preferably has a width of 64 bits (one for each bank in a given memory device), and a depth of 32 bits (one for each memory device supported). If memory devices of a different size were used (such as memory devices with only 32 banks, for example), then certain bits of the table are ignored. Thus, each row indicates the status of all of the banks in a particular memory device. Each bit in the Valid ID Table indicates which banks in the system memory are active at any given time. In the preferred embodiment, the bank is shown to be active by setting the associated bit in the Valid ID Table. Thus, an examination of the Valid ID Table informs the system regarding which banks are targeted by currently executing memory requests, while the Page Table indicates which rows in those banks are being accessed.

Referring now to FIG. 3, the Zbox memory controller 190 and the signals associated with the present invention are shown in a simplified block diagram for purposes of illustration. According to the preferred embodiment, the DIFT 191 generates address signals that are transmitted to the memory mapper 192. In addition, the DIFT 191 produces a memory valid signal that is transferred to the DRAM transaction queue (or ZRQ) 193 to indicate a valid memory address is being presented as a candidate for the DRAM transaction queue. The memory mapper 192 receives addresses from the DIFT 191 and generates signals that identify the DEVICE, BANK, ROW and COLUMN of the pending memory request that is a candidate for loading in one of the queues of the DRAM transaction queue (also referred to as the Zbox Request Queue, or simply ZRQ) 193. According to the preferred embodiment, the value of the DEVICE and BANK signals are compared with each of the values of the transactions awaiting execution in the DRAM transaction queues. If a bank conflict is found between the address being checked in the memory mapper 192 and any pending or executing instruction, the ZRQ 193 issues a Reject signal to the DIFT 191, causing the transaction with the address being checked to be recycled in the DIFT 191. Thus, if a bank conflict is detected, the Reject signal from the ZRQ 193 causes the conflicting transaction not to be loaded in the ZRQ 193.

The conflict detection mechanism preferably is pipelined over consecutive clock cycles. During the first one or more cycles, the DIFT 191 transfers a pending memory request to the memory mapper 192. On the next cycle, the pending memory request is mapped by the memory mapper 192 into the proper memory format, which for Rambus includes formatting for device, bank, row and column. During the subsequent cycle, the Page Table preferably is accessed to determine the state of the targeted bank. Finally, during the third cycle after the DIFT transmits the pending memory request, the entire DRAM transaction queue is checked for conflicts. By breaking the conflict checking procedure up into multiple stages, the procedure can be pipelined, so that the checking of a different pending memory request can begin each clock cycle. Moreover, because the processor operates at a much higher clock speed than a memory access, the conflict-checking process can occur without incurring any additional wait states.

Figure 5A:
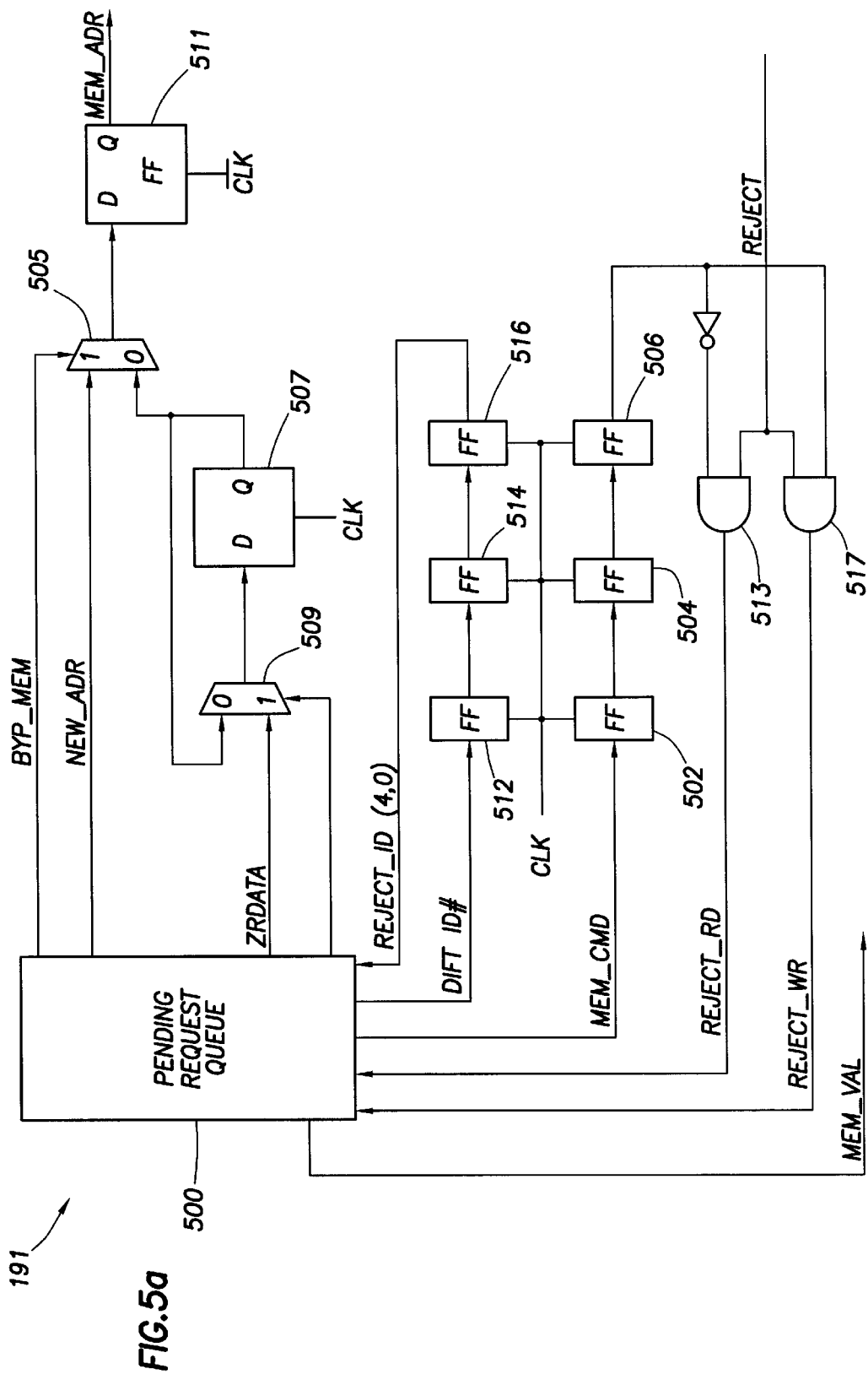
FIGS. 5a–5c are schematic block diagrams of the directory-in-flight table, memory mapper and DRAM transaction queues of FIG. 3, constructed in accordance with the preferred embodiment.

Referring now to FIGS. 3 and 5a, the DIFT 191 will be described in more detail in accordance with the preferred embodiment. In the preferred embodiment, the DIFT 191 includes a pending request queue 500 and associated logic. Preferably, the associated logic forms part of the DIFT 191, but as one skilled in the art will appreciate, the associated logic may be implemented separately. According to the preferred embodiment, the pending request queue 500 transmits the address of the memory request to the middle mapper 192 on one of two different input lines. The first input line from the DIFT is the new address (new_adr (28,0)) signal that provides a first input to a multiplexer 505. The second input to multiplexer 505 comprises the Zbox request data (zrdat (30,2)) signal, which is passed through a D flip-flop 507 and a feedback multiplexer 509. The D flip-flop 507 receives a clock input ("CLK") signal, which preferably is the processor clock signal. The feedback multiplexer 509 functions to hold the address until the memory valid signal is generated by the precharge queue 500. The multiplexer 505 receives a control signal indicating if a bypass condition exists, requiring a new memory signal to be bypassed directly to the middle mapper. This control signal is shown in FIG. 5a as the byp_mem signal. Thus, if a bypass condition exists, as indicated by the assertion of the byp_mem signal, the multiplexer selects the new_adr (28,0) signal from the pending request queue 500, which then is received by the middle mapper as the mem_adr signal. The bypass signal may be used, as necessary, to expedite the handling of a memory transaction, without requiring it to be stacked in the pending request queue 500. If no bypass condition exists, the multiplexer 505 passes the next Zbox request data (zrdat (30,2)) signal stored in the pending request queue 500. The output of the multiplexer 505 preferably connects to a D flip-flop 111, whose output comprises the mem_adr (28,0) signal that couples to the middle mapper 192 (see FIG. 5b). Preferably, flip-flop 511 is clocked on the falling edge of the processor clock, while flip-flop 507 is clocked on the rising edge of the processor clock.

The pending request queue 500 also generates the memory valid signal indicating a new request is available for mapping on the mem_val output line. The mem_val signal is provided to the DRAM transaction queue, and is used to sample the DRAM transaction queues for conflicts, as will be discussed below in relation to FIG. 5c. The pending request queue 500 also produces a memory command type (mem_cmd) signal that indicates if the current operation is a read or a write transaction. The mem_cmd signal is transmitted to the DRAM transaction queue (not shown) to identify the type of transaction requested for a particular memory access. Thus, if the pending memory request is accepted by the DRAM transaction queue, the mem_cmd signal determines if the transaction is processed through the CRQ 575 or the CRW 585 (FIG. 5c).

The mem_cmd signal cascades through three D flip-flops 502, 504, 506, and then is combined together in an AND operation in AND gates 513, 517, with the Reject signal from the ZRQ 193. As shown in FIG. 5a, the mem_cmd signal is inverted prior to applying to the input terminal of AND gate 513. The Reject signal from the ZRQ 193 is provided as an input signal to AND gates 312, 314. The output of AND gate 513 produces the Reject_RD signal that is provided as an input to the pending request queue 500. The output of AND gate 517 produces the Reject_WR signal that is applied to the pending request queue 500. The DIFT ID#, which is used to track rejected addresses, also appears as an output signal on the Reject_ID (4,0) line. This signal also is cascaded through three D flip-flops 512, 514, 516 and is fed back to the pending request queue 500 as the Reject_ID (4,0) signal.

Thus, in addition to generating the memory address ("mem_adr") signal identifying the next pending memory request, the pending request queue 500 also generates a memory valid ("mem_val") signal indicating a valid memory request has been issued. The pending request queue also concurrently issues a memory command type ("mem_cmd") signal that is delayed for three clock cycles, and then combined with the status of the Reject signal to indicate if a reject has occurred due to a bank conflict. The circuitry thus assumes that the Reject signal will appear in three clock cycles. Similarly, the pending request queue 500 concurrently transmits a DIFT ID# signal, identifying the entry in the pending request queue being transmitted to the memory mapper. This ID signal also is delayed for three clock cycles and returned to the pending request queue coincidentally with the receipt of the Reject signal from the DRAM transaction queue 193.

Figure 5B:
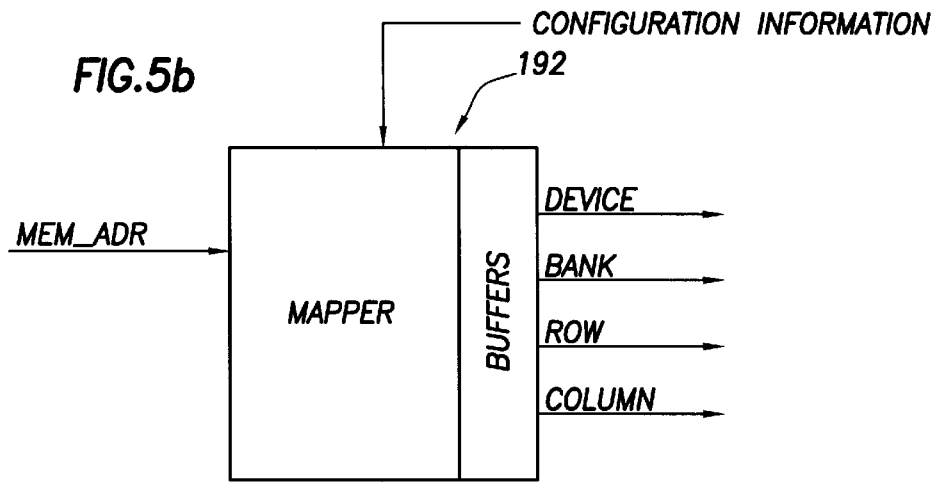
Figure 5C:
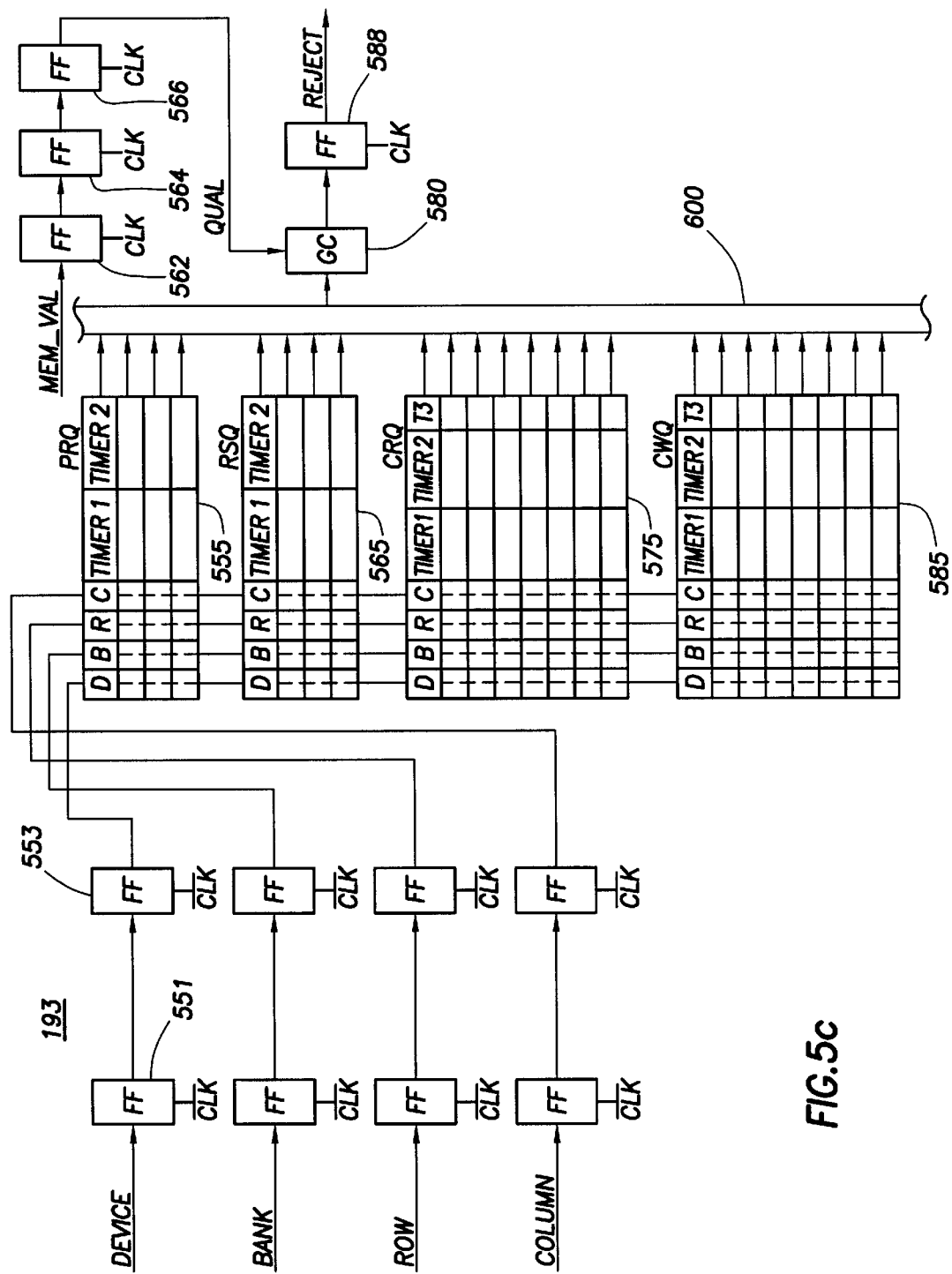

Referring now to FIG. 5b, the memory mapper 192 receives the memory address signal (mem_adr (28,0)) from the DIFT 191, together with configuration information regarding the memory devices that are implemented in the system. The middle mapper 192 then produces formatted address output signals, that are latched through a buffer section. The formatted address output signals preferably include separate output signals indicating the respective device, bank, row and column that is targeted by the memory request. These signals appear on lines identified as DEVICE, BANK, ROW, and COLUMN in FIG. 5b.

Referring now to FIG. 5c, the ZRQ 193 preferably comprises four queues, including the precharge queue 555, the RAS queue 565, the CAS Read queue 575 and the CAS Write queue 585. The precharge and RAS queues preferably comprise queues with four entries, while the two CAS queues comprise eight entry queues. Each entry in the queue includes bits that identify the device, bank, row, column, and information regarding two (or three) different timer values. The ZRQ 193 receives the DEVICE signal and clocks (preferably on the falling edge of the processor clock) the DEVICE signal through a pair of cascaded flip-flops 551, 553. The output of the second flip-flop 553 then is compared with each of the DEVICE entries in each transaction queue to determine if the pending memory request targets the same memory device as any entry in the queue. In similar fashion, each of the BANK signals is then compared with all of the BANK entries to determine if a match exists. If a match exists as to any queue entry with the DEVICE and BANK signals, a conflict condition is indicated by enabling a pull-down transistor that pulls down the voltage of a dynamic wire 600.

All of the reject conditions are logically OR'ed together using the dynamic wire 600, according to techniques that are well known in the art. The dynamic wire works as follows. In the initial clock phase, the wire is unconditionally driven high. In the other clock phase, the unconditional drive is turned off, and weak keeper devices hold the state of the wire high. If any reject condition exists at this time, a pull-down transistor is enabled, which drives the wire low, where it stays until unconditionally driven high on the next clock phase.

According to the preferred embodiment, the memory valid ("Mem_valid") signal received from the pending request queue 500 cascades through three flip-flops 562, 564, 566, on consecutive clock cycles to produce a qualified ("Qual") signal, indicating a valid memory signal is present during the evaluation cycle of the dynamic wire. A glitch catcher 580 samples the dynamic wire 600 during the evaluate phase of the dynamic wire, which is after the precharge phase. The glitch catcher 580 preferably includes a latch (not shown) that converts the dynamic result into a full cycle valid signal. The full cycle valid signal then is AND'ed with the Qual signal to produce the Reject result. Thus, if a match occurs between the DEVICE and BANK of a pending transaction and a queue entry, the reject wire 600 is pulled low and captured in an output latch in glitch catcher 580. The latched signal is combined with the Qual signal and transmitted to a D flip-flop 588, which is clocked by the processor clock. The output of the D flip-flop 588 comprises the Reject signal, which is transmitted back to the pending request queue 500 (FIG. 5a).

According to the preferred embodiment, logic may also be provided to prevent the Reject signal from being asserted in the event that the address targets a page that is the subject of a stored entry in one or more CAS queues. Thus, if a memory transaction is directed to the same memory page as another transaction in one of the CAS queues, that pending transaction will not be rejected, but instead will be processed in conjunction with the other transaction to the same page to achieve page mode efficiencies. In addition, the present invention may be used to assert the Reject signal in response to RAMbus timing parameter conflicts, such as $t_{PP}$, $t_{RR}$, $t_{RDP}$, $t_{RTP}$ and $t_{RTR}$, or if any of the queues are full.

Thus, the DRAM transaction queue 193 stores address information for transactions that have been sent to the DRAM memory system, and for those that are awaiting execution. The transaction queue preferably requires that all new entries stored in any of queues 555, 565, 575, or 585 must not pose a bank conflict with any other queued or executing transaction, thereby making each entry in the queues read to be immediately issued to the DRAM memory system. Transactions remain in the queues for as long as they need to be tracked for proper DRAM operation. The tracking times can be determined by the values stored in the timer bits of each queue entry.

On each processor cycle, a new candidate from the pending request queue preferably is presented to the memory mapper. After formatting and checking the DRAM Page Table, the memory mapper delivers the candidate's device and bank address for comparison with the contents of the DRAM transaction queue to check for any bank conflicts. If no conflicts are found, the transaction is accepted and scheduled to the DRAM memory system at the appropriate time, according to the timing requirements of the DRAM components. The detection of a bank conflict causes the reject condition to be asserted for that entry, if it is valid.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a processor operating at a speed determined by a processor clock signal;
   a memory comprised of a plurality of memory banks, and wherein said processor is capable of accessing the memory banks;
   a memory controller interfacing said processor to said memory, said memory controller including:
     a pending request queue having a top and a plurality of entries in which pending memory requests from the processor are loaded, each of said memory requests is loaded into the top of the pending request queue;
     a memory mapper coupled to said pending request queue, said memory mapper capable of receiving a pending memory request from said pending request queue, and wherein said memory mapper produces a formatted memory request signal with a device and bank value; and a transaction queue that includes a plurality of queues with multiple entries in which memory transactions are stored prior to execution, and wherein each of said multiple entries in said plurality of queues includes a field identifying the device and bank targeted by that particular memory transaction, and wherein said transaction queue compares the device and bank value of the formatted memory request signal with the device and bank fields of each of said multiple entries in said plurality of queues to determine if a bank conflict exists;

wherein said transaction queue generates a reject signal that is transmitted to said pending request queue if a bank conflict is detected and said pending request queue reloads the pending memory request at the top of pending request queue in response to said reject signal from said transaction queue.

2. The computer system of claim 1, wherein the pending address queue presents a new pending memory request to the memory mapper on each cycle of the processor clock signal.

3. The computer system of claim 2, wherein the memory mapper is capable of formatting a pending memory request on each cycle of the processor clock signal.

4. The computer system of claim 3, wherein said memory comprises RAMbus memory with a plurality of memory banks on each RAMbus device.

5. The computer system of claim 4, wherein said memory controller supports up to 32 RAMbus devices.

6. The computer system as in claim 3, wherein said memory banks share a sense amp that stores pages when opened by the memory controller.

7. The computer system of claim 1, wherein said reject signal is not asserted if the pending memory request targets the same memory page as an entry in at least one of said plurality of queues.

8. The computer system of claim 1, wherein said memory comprises RAMbus memory with 64 memory banks in each memory device.

9. The computer system as in claim 1, wherein said pending request queue includes twenty-four entries for storing pending memory requests.

10. The computer system as in claim 9, wherein said transaction queue includes a precharge queue, a RAS queue, a CAS read queue and a CAS write queue.

11. The computer system as in claim 10, wherein said precharge queue and said RAS queue have at least four entries, and said CAS read queue and said CAS write queue have at least eight entries.

12. The computer system of claim 1, further comprising a dynamic wire coupled to said plurality of queues in said transaction queue, and wherein said dynamic wire is pulled low in response to the detection of a bank conflict.

13. The computer system of claim 12, wherein said pending request queue generates a memory valid signal concurrently with said pending memory request, and wherein said memory valid signal on a subsequent cycle of the processor clock signal causes said dynamic wire to be sampled.

14. The computer system of claim 13, wherein the dynamic wire is sampled on the third clock signal after the memory valid signal is transmitted by said pending request queue to said memory mapper.

15. A computer system, comprising:

a processor operating at a speed determined by a processor clock signal;

a memory comprised of a plurality of memory banks, and wherein said processor is capable of accessing the memory banks;

a memory controller interfacing said processor to said memory, said memory controller including:

a pending request queue having a top and a plurality of entries in which pending memory requests from the processor are loaded, each pending memory request loaded at the top of the pending request queue, and said pending request queue generates an address signal associated with one of said pending memory requests stored in said pending request queue;

a memory mapper coupled to said pending request queue, said memory mapper receiving said address signal from said pending request queue, and wherein said memory mapper produces a formatted memory address signal with a memory bank value; and a transaction queue that includes a plurality of queues with multiple entries in which memory transactions are stored prior to execution, and wherein each of said multiple entries in said plurality of queues includes a field identifying the memory bank targeted by that particular memory transaction, and wherein said transaction queue compares the bank value of the formatted memory address signal with the bank field of each of said multiple entries in said plurality of queues to determine if a bank conflict exists;

wherein said transaction queue generates a reject signal that is transmitted to said pending request queue if a bank conflict is detected, and said pending request queue reloads the pending memory request at the top of the pending request queue in response to said reject signal from said transaction queue.

16. The computer system of claim 15, wherein said pending request queue is capable of generating a new address signal on each cycle of the processor clock signal.

17. The computer system of claim 15, wherein said reject signal is not asserted if the pending memory request targets the same memory page as an entry in at least one of said plurality of queues.

18. The computer system of claim 17, wherein said at least one queue comprises a CAS read queue and a CAS write queue.

19. The computer system as in claim 15, wherein said transaction queue includes a precharge queue, a RAS queue, a CAS read queue and a CAS write queue.

20. The computer system of claim 19, further comprising a dynamic wire coupled to said plurality of queues in said transaction queue, and wherein said dynamic wire is pulled low in response to the detection of a bank conflict.

21. The computer system of claim 19, wherein said pending request queue generates a memory valid signal concurrently with said address signal, and wherein said memory valid signal on a subsequent cycle of the processor clock signal causes said dynamic wire to be sampled.

22. The computer system of claim 15, wherein the pending request queue may bypass the entries in the pending request queue when generating the address signal.

23. A computer system, comprising:

a plurality of processors that are coupled together;

a memory associated with each of said plurality of processors, wherein each of said plurality of processors is capable of accessing the memory associated with any other processor, and a memory controller interfacing each of said processors to said associated memory, said memory controller including:

a pending request queue having a top and a plurality of entries in which pending memory requests from the plurality of processors are stored, each pending memory request is loaded at the top of the pending request queue;

a memory mapper coupled to said pending request queue, said memory mapper capable of receiving a pending memory request from said pending request queue, and wherein said memory mapper produces a formatted memory request signal with a device and bank value; and a transaction queue that includes a plurality of queues with multiple entries in which memory transactions are stored prior to execution, and wherein each of said multiple entries in said plurality of queues includes a field identifying the device and bank targeted by that particular memory transaction, and wherein said transaction compares the device and bank value of the formatted memory request signal with the device and bank fields of each of said multiple entries in said plurality of queues to determine if a bank conflict exists and, if a bank conflict exists, said transaction queue causes a pending memory request in the pending request queue to be placed back at the top of the pending request queue.

24. A method of checking for bank conflicts in a computer system, comprising the acts of:

transmitting a pending memory request to a memory mapping device;

formatting the pending memory request into device, bank, row and column signals;

comparing the bank signal of the formatted pending memory request with all entries in a memory transaction queue;

asserting a reject signal if an entry in the memory transaction queue targets the same bank as the formatted pending memory request; and recycling the pending memory request in response to the assertion of the reject signal to the top entry in a buffer.

25. A method as in claim 24, wherein the acts of transmitting, formatting, comparing, and asserting each occur in a single clock cycle of the computer system.

26. A method as in claim 24, wherein the act of comparing also includes comparing the device signal of the formatted pending memory request with all entries in the memory transaction queue, and said reject signal only is asserted if a particular entry matches both the device and bank signal.

27. A method as in claim 26, wherein the act of comparing also includes comparing the row signal of the formatted pending memory request with all entries in at least one of the memory transaction queues, and wherein said reject signal is not asserted for a particular entry if the row signal matches that entry's row value.

28. A method as in claim 24, wherein the acts of transmitting, formatting and comparing are pipelined.

* * * * *